US010761186B2

(12) United States Patent
Schrattenecker et al.

(10) Patent No.: US 10,761,186 B2
(45) Date of Patent: Sep. 1, 2020

(54) RF RECEIVER WITH BUILT-IN TEST CAPABILITIES

(71) Applicant: Infineon Technologies AG, Neubiberg (DE)

(72) Inventors: Jochen O. Schrattenecker, Reichenthal (AT); Florian Starzer, Ennsdorf bei Enns (AT); Oliver Frank, Linz (AT); Michael Kropfitsch, Koettmannsdorf (AT); Georg Krebelder, Ottensheim (AT); Helmut Kollmann, Linz (AT); Thomas Sailer, Zwettl a.d. Rodl (AT)

(73) Assignee: Infineon Technologies AG, Neubiberg (DE)

( * ) Notice: Subject to any disclaimer, the term of this patent is extended or adjusted under 35 U.S.C. 154(b) by 314 days.

(21) Appl. No.: 15/834,118

(22) Filed: Dec. 7, 2017

(65) Prior Publication Data

US 2018/0172801 A1 Jun. 21, 2018

(30) Foreign Application Priority Data

Dec. 16, 2016 (DE) .................. 10 2016 124 657
Nov. 21, 2017 (DE) .................. 10 2017 127 416

(51) Int. Cl.
*G01S 7/40* (2006.01)
*G01S 7/03* (2006.01)
(Continued)

(52) U.S. Cl.
CPC ............ *G01S 7/4021* (2013.01); *G01S 7/032* (2013.01); *G01S 7/352* (2013.01); *G01S 2007/4069* (2013.01); *G01S 2013/9321* (2013.01)

(58) Field of Classification Search
CPC ........ G01S 7/4021; G01S 7/032; G01S 7/352; G01S 2007/4069; G01S 2013/9321; G01S 7/22; G01S 7/4052; G01S 7/4056; G01R 31/2822; H04B 17/20; H04B 1/0014; H04B 17/19; H03L 5/00
See application file for complete search history.

(56) References Cited

U.S. PATENT DOCUMENTS 3,341,849 A * 9/1967 Cordry .................. G01S 7/4056
342/89
4,145,692 A * 3/1979 Armstrong ................ G01S 7/22
342/173
(Continued)

FOREIGN PATENT DOCUMENTS

CN 105450244 A 3/2016

OTHER PUBLICATIONS

"A Technical Tutorial on Digital Signal Synthesis"; no author given; published by Analog Devices, Inc.; Norwood, MA, USA; copyright in the year 1999; 122 pages. (Year: 1999).*
(Continued)

*Primary Examiner* — Bernarr E Gregory
(74) *Attorney, Agent, or Firm* — Harrity & Harrity, LLP (57) ABSTRACT

A radar device comprises a test signal generator including a digital harmonic oscillator that generates a digital oscillator signal with a first spectral component; a first digital-to-analog-converter that generates an analog oscillator signal based on the digital oscillator signal. Furthermore, the radar device comprises at least one radar channel receiving the analog oscillator signal during one or more self-tests.

20 Claims, 7 Drawing Sheets

(51) Int. Cl.
*G01S 7/35* (2006.01)
*G01S 13/931* (2020.01)
*G01R 31/28* (2006.01)
*H04B 17/20* (2015.01)
*G01S 13/00* (2006.01)

(56) References Cited

U.S. PATENT DOCUMENTS

| | | | | |
|---|---|---|---|---|
| 4,315,219 A * | 2/1982 | Rocheleau | ............... | H03L 5/00 |
| | | | | 327/106 |
| 5,337,316 A * | 8/1994 | Weiss | ................ | H04B 17/19 |
| | | | | 714/716 |
| 5,432,516 A * | 7/1995 | Cherry | ............... | G01S 7/4056 |
| | | | | 340/435 |
| 5,886,663 A * | 3/1999 | Broxon, II | ............ | G01S 7/4052 |
| | | | | 342/165 |
| 7,382,202 B2 * | 6/2008 | Jaffe | ................. | H04B 1/0014 |
| | | | | 327/105 |

OTHER PUBLICATIONS

Liu Y., "Research and Implementation of Delta-Sigma Modulator", China Excellent Master's Degree Thesis Full-text Database, Jul. 15, 2008, 27 pages.

Yang X., "Research on Receiving and Processing of All Coherent Solid State Radar Signals", China Excellent Master's Degree Thesis Full-text Database, May 15, 2016, 7 pages.

* cited by examiner

RF RECEIVER WITH BUILT-IN TEST CAPABILITIES

RELATED APPLICATIONS

This application claims priority under 35 U.S.C. § 119 to German Patent Application No. 102017127416.2, filed on Nov. 21, 2017 and 35 U.S.C. § 119 to German Patent Application No. 102016124657.3, filed on Dec. 16, 2016, the contents of which are incorporated by reference herein in their entirety

TECHNICAL FIELD

The present disclosure relates to the field of radio frequency (RF) transmitter or transceiver circuits, particularly to an RF receiver chip including testing capability.

BACKGROUND

Radio frequency (RF) receivers and transceivers can be found in numerous applications, particularly in the field of wireless communications and radar sensors. In the automotive sector, there is an increasing demand for radar sensors used, for example, in so-called "adaptive cruise control" (ACC) or "radar cruise control" systems. Amongst other applications, such systems may be used to automatically adjust the speed of an automobile so as to maintain a safe distance from other automobiles ahead.

Modern radar systems make use of highly integrated RF circuits, which may incorporate, amongst others, the RF font-end and the subsequent analog base band (or intermediate frequency band) signal processing chain in one single package (single chip transceiver). RF front-ends usually encompass all circuitry components operating in the RF band including, for example, directional couplers (e.g. rat race coupler, circulators, etc.), RF oscillators, RF amplifiers, and mixer(s). These integrated RF circuits are often referred to as monolithic microwave integrated circuits (MMIC).

Radar applications used in automobiles are subject to various standards concerning road traffic safety, for example the functional safety standard ISO 26262 titled "Road vehicles—Functional safety". To ensure the functional safety of a radar sensor, it may be important to know whether the current state of the radar sensor allows a reliable distance and speed measurement. However, also in applications different from radar, reliability may be an issue. Thus there is a need for RF transceivers having improved self-test capability to increase the reliability of the overall system.

SUMMARY

A radar device is described herein. In accordance with one embodiment, the radar device comprises a test signal generator including a digital harmonic oscillator that generates a digital oscillator signal with a first spectral component and a first digital-to-analog-converter that generates an analog oscillator signal based on the digital oscillator signal. Furthermore, the radar device comprises at least one radar channel receiving the analog oscillator signal during one or more self-tests.

In accordance with another embodiment the radar device comprises a test signal generator including a digital harmonic oscillator that generates a digital oscillator signal with a first spectral component and a first digital-to-analog-converter that generates an analog oscillator signal based on the digital oscillator signal. Furthermore, the radar device includes a modulator configured to convert the analog oscillator signal into an RF band thus generating an RF test signal that includes the first spectral component frequency shifted to the RF band. At least one radar channel receives the RF test signal during one or more self-tests.

In accordance with another embodiment the radar device comprises a test signal generator including a digital harmonic oscillator that generates a digital oscillator signal with a first spectral component and a first digital-to-analog-converter that generates an analog oscillator signal based on the digital oscillator signal. Furthermore, the radar device comprises a modulator configured to convert the analog oscillator signal into an RF band thus generating an RF test signal that includes the first spectral component frequency-shifted to the RF band. The radar device further comprises a radar channel with an RF receiver circuit that is configured to receive an RF input signal. The RF receiver circuit includes a mixer that receives the RF input signal and a local oscillator signal, down-converts the RF input signal into an intermediate frequency or base band, and provides the down-converted signal as mixer output signal. The RF receiver circuit further includes an analog-to digital converter that provides a digital radar signal representing the mixer output signal. A signal processor receives the digital radar signal and is configured to determine at least one spectral component of the digital radar signal. During a test, the RF test signal is directed, as RF input signal, to the radar channel, wherein the signal processor is configured to determine whether the at least one spectral component of the digital radar signal corresponds to the first spectral component.

In accordance with another embodiment the radar device comprises a test signal generator including a digital harmonic oscillator that generates a digital oscillator signal with a first spectral component and a first digital-to-analog-converter that generates an analog oscillator signal based on the digital oscillator signal. The radar device further comprises a radar channel with an RF receiver circuit that includes a mixer configured to receive an RF input signal of the radar channel and a local oscillator signal, to down-convert the RF input signal into an intermediate frequency or base band, and to provide the down-converted signal as mixer output signal. The RF receiver circuit further includes an analog-to digital converter that provides a digital radar signal representing the mixer output signal. A signal processor is configured to receiving the digital radar signal to perform a spectral analysis of the digital radar signal. During a test, the analog oscillator signal is direct to a circuit node coupled to an output of the mixer of the radar channel.

BRIEF DESCRIPTION OF THE DRAWINGS

The disclosure can be better understood with reference to the following drawings and descriptions. The components in the figures are not necessarily to scale; in-stead emphasis is placed upon illustrating the principles of the invention. Moreover, in the figures, like reference numerals designate corresponding parts. In the drawings.

DETAILED DESCRIPTION

Embodiments of the present disclosure are discussed below in the context of a radar transceiver. It should be noted, however, that the present disclosure may also be applied in applications different from radar such as, for example, RF transceivers of RF communication devices.

Figure 1:
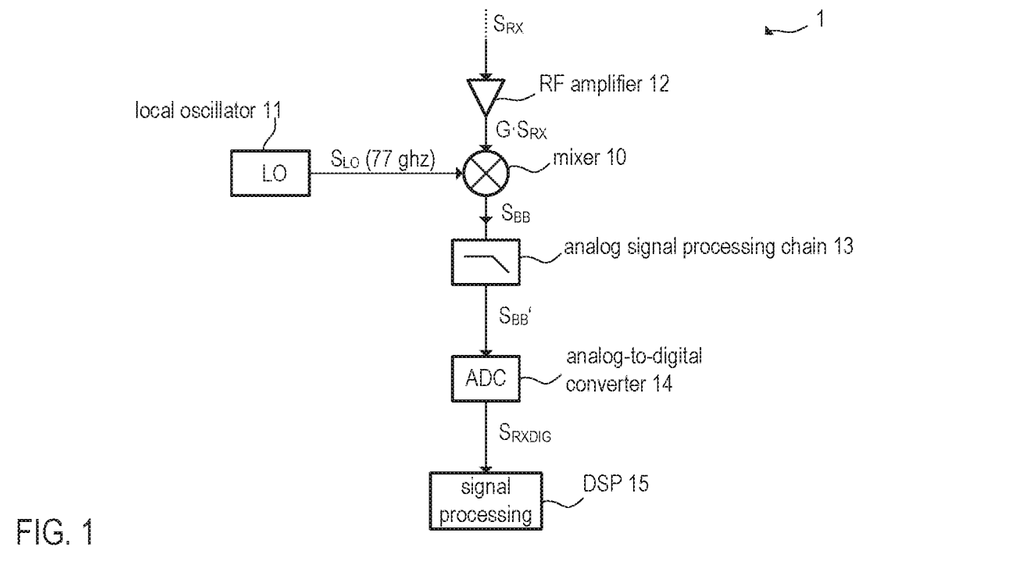
FIG. 1 is a block diagram illustrating the basic structure of the reception path of a RF transceiver chip.

A so-called "single chip radar" may include circuitry providing the core functions needed for distance and/or velocity measurement in one chip (e.g. a MMIC). Thus the chip may include, inter alia, directional couplers, RF oscillators, amplifiers, mixers, filters, analog-to-digital converters, and digital signal processors. FIG. 1 illustrates the reception path of an RF transceiver 1 (or an RF receiver) as used, for example, in a radar distance measurement device. Accordingly, the RF transceiver/receiver 1 includes a mixer 10 which is supplied with an RF input signal $S_{RX}$ at the RF input of the mixer 10 and an RF oscillator signal $S_{LO}$ at a reference input of the mixer. The RF oscillator signal $S_{LO}$ is used to down-convert the RF input signal $S_{RX}$ into the base band or an intermediate frequency (IF) band. The RF input signal $S_{RX}$ may be provided by an antenna (not shown in FIG. 1) and may be pre-amplified before being supplied to the mixer 10. In the present example, the input signal $S_{RX}$ received from an antenna is amplified by amplifier 12 (e.g. a low noise amplifier, LNA) by a gain G.

The RF oscillator signal $S_{LO}$ is generated by a local oscillator (LO) 11, which may, for example, include a voltage controlled oscillator (VCO) coupled in a phase locked loop (PLL). However, the RF oscillator signal $S_{LO}$ (LO signal) may be provided by other circuitry dependent on the actual application. When used in a radar distance measurement device, the RF oscillator signal $S_{LO}$ may be in the range between approximately 20 GHz and 200 GHz (approximately 77 GHz in the present example). However, higher or lower frequencies may also be applicable.

As mentioned, the mixer 10 down-converts the RF input signal $S_{RX}$ (amplified antenna signal) into the base band (or IF band). The respective base (or IF) band signal (i.e. the mixer output signal) is denoted by $S_{BB}$. The base band signal $S_{BB}$ is then subject to analog signal pre-processing (analog signal processing chain 13) to suppress undesired sidebands or image frequencies. The analog signal processing chain 13 may include, inter alia, one or more amplifier stages, a low-pass and a high-pass filter (or a band-pass filter). The pre-processed base band signal is denoted by $S_{BB}'$. Receivers which make use of a mixer to down-convert the RF input signal into the base band or an IF band are as such known as heterodyne receivers and thus not further discussed in more detail. The pre-processed base band signal $S_{BB}'$ is then digitized (i.e. sampled and quantized) to generate a digital radar signal $S_{RXDIG}$ (see FIG. 1, analog-to-digital converter 14), which is then further processed in the digital domain. In case of a down-conversion into an IF band, the IF signal may also be digitized and subsequently further demodulated in the digital domain. Generally, the digital signal processing may be performed using, e.g., a digital signal processor (DSP) executing appropriate software instructions. In the present example, a single mixer 10 is used to down-convert the RF signal from the RF band into the base-band in one step. However, in some embodiments the down-conversion may be accomplished in two or more steps (e.g. via one or more IF bands).

Figure 2:
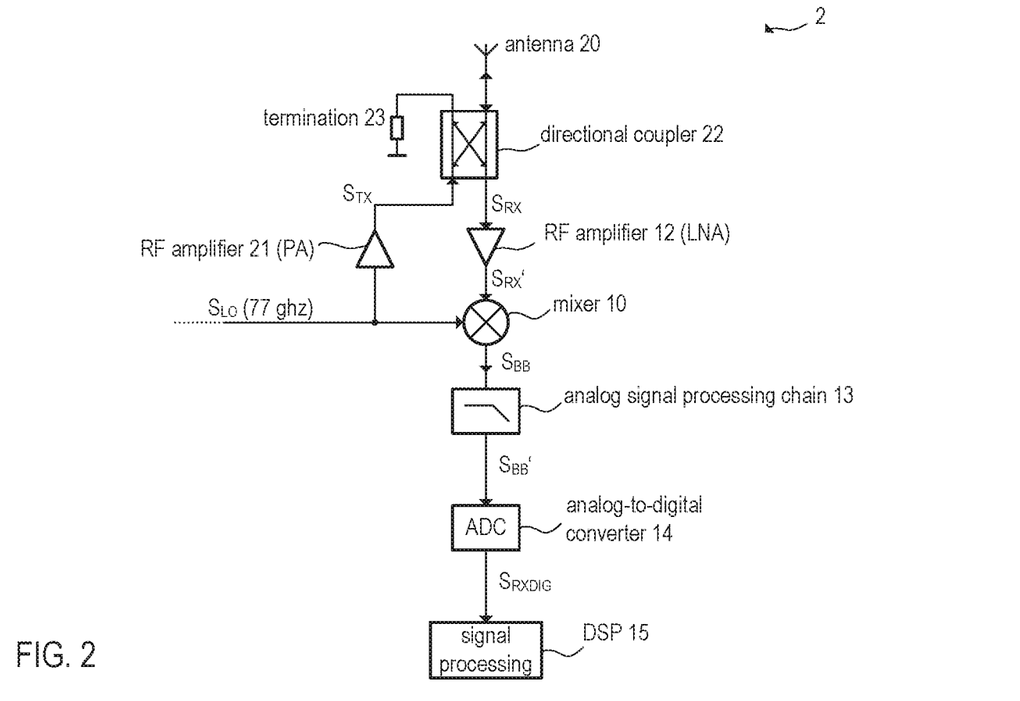
FIG. 2 is a block diagram illustrating the reception/transmission path of a monostatic radar transceiver chip.

FIG. 1 illustrates the reception path of an RF receiver or transceiver. In so-called bistatic or pseudo-monostatic radar systems the receiver may be separate from the transmitter as receiver and transmitter use separate antennas. FIG. 2 illustrates a RF transceiver 2 (combined receiver and transmitter), which may be used in a monostatic radar system, in which the same antenna is used to transmit and receive RF signals. The transceiver illustrated in FIG. 2 includes a directional coupler 22, which is coupled between the mixer 10 and an antenna 20 and configured to direct the RF input signal $S_{RX}$, received by the antenna 20 to the respective reception channel and thus to the mixer 10. Moreover, the directional coupler 22 is configured to direct the RF oscillator signal $S_{LO}$ (after amplification by RF power amplifier 21) to the antenna 20, which transmits a respective electromagnetic radar signal. In FIG. 2, the amplified RF oscillator signal is denoted as $S_{TX}$ (transmitted radar signal). Besides the directional coupler 22, the reception channel (e.g., inter alia, amplifier 12, mixer 10, analog signal processing chain 13, analog-to-digital converter 14, signal processor 15) is the same as in FIG. 1 and the respective explanations are thus not repeated here.

The directional coupler 22 may be implemented as rat-race coupler formed by strip lines or as circulator. However, other types and implementations of directional couplers may be used. Particularly when using a rat race coupler, one port of the coupler may be terminated by a termination impedance 23. The directional coupler 22 may be implemented in the same chip or chip package as the other circuit components of the transceiver to provide a single chip solution in one single MMIC. An antenna array may be used instead of a single antenna 20. Dependent on the implementation, the antenna(s) may be integrated in the chip package that includes the MMIC. In some applications, eWLB (extended Wafer Level Ball Grid Arrays) packages may be used as chip package.

Figure 3:
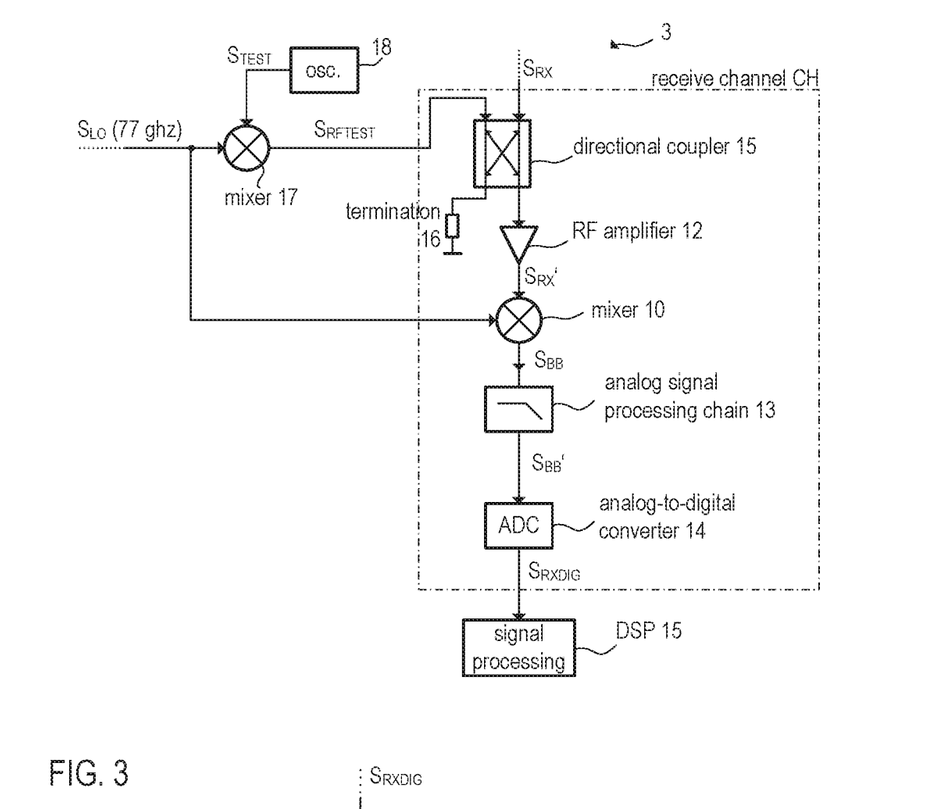
FIG. 3 is a block diagram illustrating the RF transceiver of FIG. 1 including additional circuitry for providing self-test function.

FIG. 3 is a block diagram, which illustrates an RF transceiver 3 similar to the example of FIG. 1 with additional circuitry for providing a self-test function. The RF transceiver 3 receives the RF input signal $S_{RX}$ from an antenna or an antenna array (not shown), either via a directional coupler as shown in FIG. 2 or directly as shown in FIG. 1. The RF input signal $S_{RX}$ is directed to the mixer 10 by directional coupler 15 (not to be confused with the directional coupler 22 in FIG. 2). Like in the example of FIG. 1, the RF input signal $S_{RX}$ may be pre-amplified, wherein the amplifier 12 may be coupled upstream or downstream of the directional coupler 15. In the present example, the amplifier 12 (e.g. a LNA) is connected between directional coupler 15 and mixer 10. The signal processing chain downstream of the mixer 10 is the same as illustrated in the example of FIG. 1. Accordingly, the output of mixer 10 is coupled to the input of the analog signal processing chain 13 (e.g. filter and base-band amplifier) to suppress undesired sidebands or image frequencies in the mixer output signal $S_{BB}$ provided by the mixer 10. The output of the analog signal processing chain 13 is coupled to an analog input of analog-to-digital converter 14, which is configured to digitize the base-band signal $S_{BB}'$. The digital representation of the base-band signal $S_{BB}'$ is denoted as $S_{RXDIG}$ (digital base-band signal) and may be further processed by the digital signal processor 15. The signal processing chain from the directional coupler 15 to the analog-to-digital converter 14 is referred to as reception channel CH. A similar system with multiple reception channels is described later with respect to FIGS. 5 and 6.

The directional coupler 15 allows to direct an RF test signal $S_{RFTEST}$ to a reception channel CH of the radar receiver (i.e. to the RF input of mixer 10) in addition or alternatively to an RF input signal $S_{RX}$ received from an antenna. Like the RF input signal $S_{RX}$, the RF test signal $S_{RFTEST}$ may be pre-amplified by the amplifier 12. The directional coupler 15 may be, for example, a rat race coupler implemented using strip lines or a circulator. As usual for such couplers, one port may be terminated using a termination impedance 16. In essence, the RF test signal $S_{RFTEST}$ is "injected" into the reception channel of the transceiver/receiver, which therefore "sees" the RF test signal $S_{RFTEST}$ like a regular RF input signal received from an antenna. Thus, the RF test signal $S_{RFTEST}$ may also be regarded as "simulated" antenna signal caused by a "virtual" radar target. The RF test signal $S_{RFTEST}$ may be generated using a modulator 17 (e.g. an IQ modulator, a mixer, etc.), which modulates the RF oscillator signal $S_{LO}$ (provided, e.g., by the local oscillator), which has a carrier frequency $f_{LO}$ (e.g., $f_{LO}$=77 GHz), with a test signal $S_{TEST}$ (modulation signal). The test signal $S_{TEST}$ may have a single frequency $f_{TEST}$ or may be a band-limited signal having a center frequency $f_{TEST}$.

One aspect of the embodiments described herein is related to the generation of the test signal $S_{TEST}$ and the corresponding RF test signal $S_{RFTEST}$. According to one embodiment, the oscillator is implemented as a digital harmonic oscillator whose digital output is converted to an analog output signal using a sigma-delta modulator (see FIGS. 7-10 and respective description).

Figure 4:
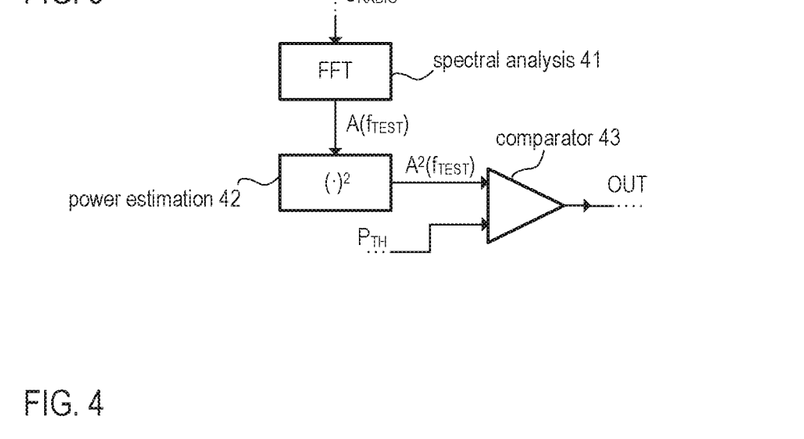
FIG. 4 illustrates one example of the signal analysis performed in a digital signal processor during a self-test of the RF transceiver of FIG. 3.

FIG. 4 illustrates, by means of a block diagram, one example of the evaluation (e.g. using DSP 15) of the digital base-band signal $S_{RXDIG}$ (i.e. the digital radar signal) to assess, whether the information carried by the test signal $S_{TEST}$ is present in the digital radar signal $S_{RXDIG}$. The information carried by the test signal $S_{TEST}$ is usually a specific signal power at a specific (test) frequency (or in a specific frequency band) of the test signal $S_{TEST}$. Accordingly, a spectral analysis of the digital radar signal $S_{RXDIG}$ is performed. This may be done using a Fast Fourier Transform (FFT) algorithm (labelled "spectral analysis 41" in FIG. 4) to obtain the magnitude of the signal $S_{RXDIG}$ for one or more discrete frequency values (often referred to as "bins"). Alternatively, other algorithms (e.g., a Goertzel algorithm) may be used for determining the magnitude A(f) of one or more specific spectral components of the signal $S_{RXDIG}$. In the present example, the frequency bin, which includes the test frequency $f_{TEST}$ of the test signal $S_{TEST}$, is considered in the subsequent signal processing. To obtain a value representing the signal power, the magnitude $A(f_{TEST})$ may be squared (referred to as "power estimation 42" in FIG. 4). In essence, the power spectral density (PSD) is evaluated for the test frequency $f_{TEST}$ in the depicted embodiment. Finally, the signal power $A^2(f_{TEST})$ at the test frequency may compared to one or more threshold values. In the present example, the threshold value $P_{TH}$ represents an expected signal power of digital radar signal $S_{RXDIG}$ at the frequency $f_{TEST}$. In case the overall signal processing chain (in particular amplifier 12, mixer 10, analog signal processing chain 13, ADC 14, and other intermediate components) of the reception channel CH of the RF transceiver 3 operates in accordance with the desired specification, the information carried by the test signal $S_{TEST}$ (e.g. signal power of digital base-band signal $S_{RXDIG}$ at the frequency $f_{TEST}$) will be detected in the digital radar signal $S_{RXDIG}$. As mentioned, in the present example, the information may be a specific signal power at the test frequency $f_{TEST}$.

In accordance with the embodiments described herein, the circuit components forming the RF receiver/transceiver as well as the circuit components needed for the self-test (particularly modulator/mixer 17, test signal generator 18, directional coupler 15) discussed above are integrated in the same semiconductor chip (MMIC) or at least in the same chip package. This allows to regularly and efficiently test the function of the signal processing chain of the reception channel CH of the RF transceiver (or RF receiver) and to quickly detect malfunctions of components in the reception channel, which might lead, for example, to unreliable or erroneous measurements. Furthermore, the single-chip solution allows to use the same signal processor for both, the regular measurement and the self-test. Particularly in radar distance and velocity sensors (also referred to as radar range sensors), measured distance and/or velocity values are repeatedly determined during subsequent measurement cycles. Between two subsequent measurement cycles, idle cycles may be inserted, during which a self-test can be performed. A self-test producing a negative result may be communicated to a control unit, which controls the operation of the overall system (system controller), and signaled to the user.

In the example described above, the power (within a specific spectral range or of a spectral line) of the digital radar signal $S_{RXDIG}$ is evaluated to determine whether the power matches with the power of the test signal. This concept can be generalized. Accordingly, the test signal generally includes test information (e.g. a specific power of a specific spectral line or the phase associated with a specific spectral line) which is transmitted via the modulator/mixer 17, the coupler 15, the mixer 10, and the ADC 14 to the signal processor. The test information is thus also included in the RF test signal $S_{RFTEST}$ as well as in the mixer output signal $S_{BB}$ and the digital base-band signal $S_{RXDIG}$. The signal processor 15 is generally configured to detect whether or not the test information is present in the digital base-band signal $S_{RXDIG}$. In case of a positive detection, the reception channel operates in accordance with the desired specification. In case the detection fails, an error may be signaled as mentioned above. In the example, of FIG. 4, the mentioned detection is accomplished by comparing the detected power $A^2(f_{TEST})$ with a threshold value $P_{TH}$ using a comparator 43.

Figure 5:
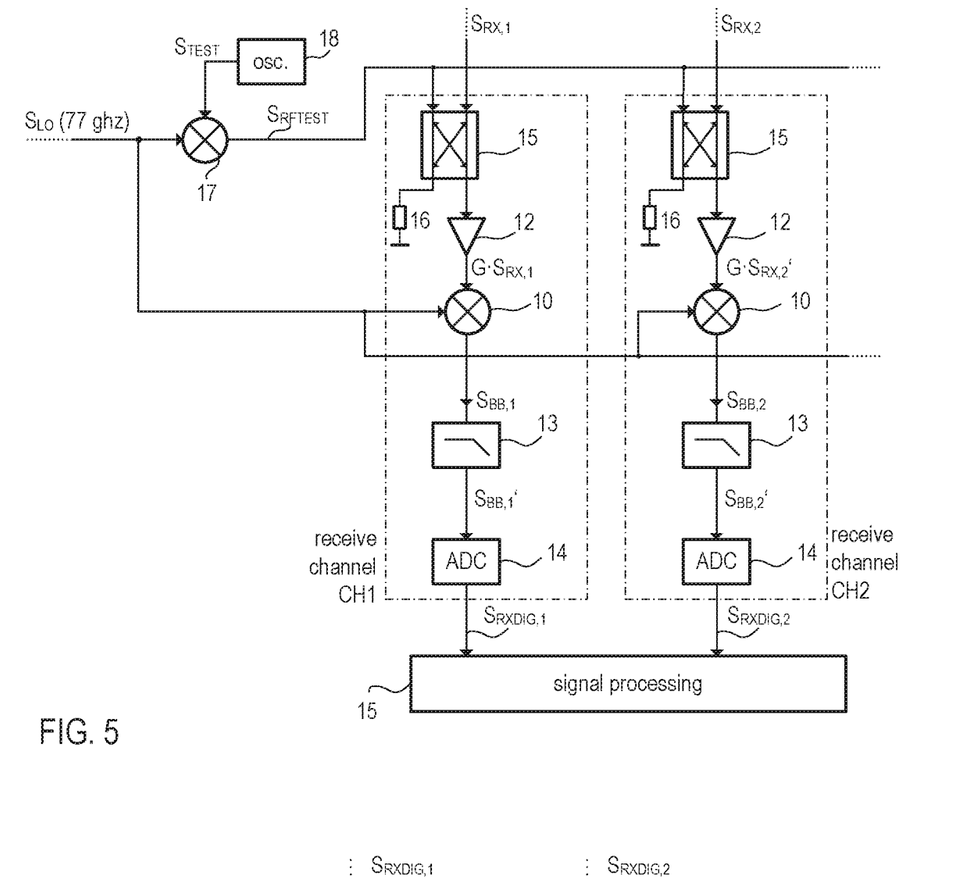
FIG. 5 is a block diagram illustrating the RF transceiver of FIG. 1 including additional circuitry for providing self-test function for multiple reception channels.

FIG. 5 is a block diagram, which illustrates an RF transceiver 3 similar to the example of FIG. 1 with additional circuitry for providing a self-test function of two or more RF reception channels CH1, CH2, etc. The circuit of FIG. 5 is essentially the same as in the previous example of FIG. 3, wherein the circuit components of the reception channel CH are duplicated for each additional reception channel. In the example of FIG. 5, each of the reception channels CH1, CH2, etc. includes a directional coupler 15 (including a termination 16 if necessary), an amplifier 12, a mixer 10, an analog signal processing chain 13, and an analog-to-digital converter 14. A separate antenna (see FIG. 2, antenna 20) may be associated with each channel CH1, CH2, etc., and the antenna signals $S_{RX,1}$, $S_{RX,2}$, etc. are supplied to the respective directional couplers 15. Similarly, the RF test signal $S_{RFTEST}$ is also supplied to the direction couplers 15 of the individual reception channels CH1, CH2. The analog-to-digital converter 14 of each channel CH1, CH2 provide respective digital base band signals $S_{RXDIG,1}$, $S_{RXDIG,2}$ like in the previous example of FIG. 3. In each channel CH1, CH2, the mixers 10 receive the amplified antenna signals $G \cdot S_{RX,1}$, $G \cdot S_{RX,2}$ as well as the local oscillator signal $S_{LO}$. The mixer output signals are denoted as $S_{BB,1}$ and $S_{BB,2}$, and the base-band signals (after analog pre-processing) are denoted as $S_{BB,1}'$ and $S_{BB,2}'$.

As shown in FIG. 5, a single local oscillator signal $S_{LO}$ (from a single local oscillator) is used to down-convert the antenna signal in each channel in order to maintain the phase relation-ship between the base-band signals $S_{BB,1}$, $S_{BB,2}$, etc. For the same reason, the same RF test signal $S_{RFTEST}$ is used for each channel CH1, CH2, etc. This allows to evaluate the phases $\varphi_1(f)$ and $\varphi_2(f)$ of the digital radar signals $S_{RXDIG,1}$, and, respectively, $S_{RXDIG,2}$ using the signal processing unit 15, which may be configured to process the digital signals provided by the channels CH1, CH2. One signal processing example is depicted in FIG. 6 as block diagram, according to which the phase differences are calculated for the digital radar signals $S_{RXDIG,1}$, $S_{RXDIG,2}$, etc.

Figure 6:
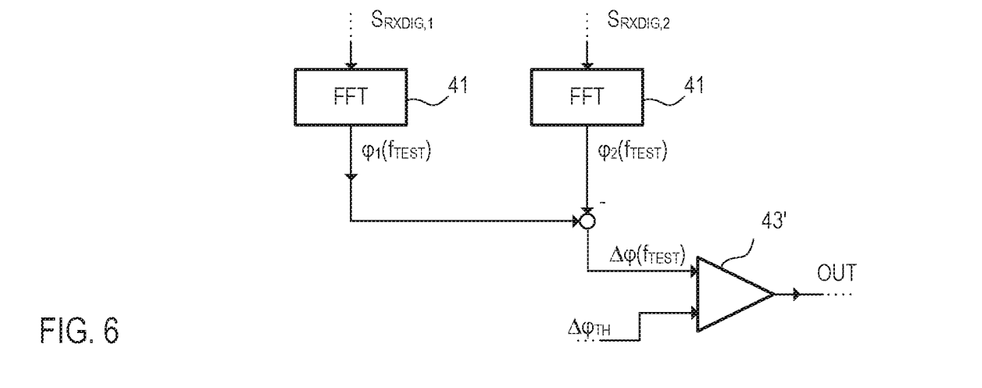
FIG. 6 illustrates one example of the signal analysis performed in a digital signal processor during a multi-channel self-test of the RF transceiver of FIG. 5.

FIG. 6 illustrates, by means of a block diagram, one example of evaluating (using DSP 15) the digital radar signals $S_{RXDIG,1}$, $S_{RXDIG,2}$, etc., which can be regarded as digital output signals of the reception channels CH1, CH2, etc. This evaluation includes assessing whether information included in the test signal $S_{TEST}$ (i.e. the phase in the present example or the signal power in the previous example), is in line with the corresponding information in the digital radar signals $S_{RXDIG,1}$, $S_{RXDIG,2}$, etc. Accordingly, it is assessed whether the information included in the signals is compliant with specific pre-defined criteria.

In the previous example of FIG. 3, the mentioned information is the signal power, and the respective criterion used in the self-test is that the signal power has to exceed a defined threshold level. In the present example, a spectral analysis of the digital base-band signals is performed to evaluate the phases of the signals $S_{RXDIG,1}$, $S_{RXDIG,2}$, etc. This may be done using a Fast Fourier Transform (FFT) algorithm (labelled "spectral analysis 41" in FIG. 6) to obtain the phases $\varphi_1(f)$, $\varphi_2(f)$ and (optionally) magnitudes $A_1(f)$, $A_2(f)$ of the signals $S_{RXDIG1}$, $S_{RXDIG2}$ for different frequency ranges (often referred to as "bins"). Alternatively, other algorithms (e.g., a Goertzel algorithm) may be used for determining the phases $\varphi_1(f)$, $\varphi_2(f)$ of one or more specific spectral components of the signals $S_{RXDIG,1}$, $S_{RXDIG,2}$. In the present example, the frequency bin including the test frequency $f_{TEST}$ of the test signal $S_{TEST}$ is considered in the subsequent signal processing. In the present example, the digital signal processor may be configured (i.e. programmed with appropriate software) to determine the phases $\varphi_1(f_{TEST})$, $\varphi_2(f_{TEST})$ of the digital output signal $S_{RXDIG,1}$, and $S_{RXDIG,2}$ of each channel CH1, CH2 and/or to determine the phase difference $\Delta\varphi(f_{TEST}) = |\varphi_2(f_{TEST}) - \varphi_1(f_{TEST})|$. The phases are evaluated for the frequency $f_{TEST}$ of the test signal $S_{TEST}$. In case the phase difference $\Delta\varphi(f_{TEST})$ exceeds a predefined threshold $\Delta\varphi_{TH}$ (which may be checked using comparator 43) the self-test will end with a negative result and an error may be signaled. For example, the negative result may be communicated to a control unit, which controls the operation of the overall system and signaled to the user (e.g. the driver of the vehicle in case of an automotive radar used in an adaptive cruise control system).

In case of a system with more than two channels CHi (i=1, 2, 3, . . . ) the respective phase value $\varphi_i(f_{TEST})$ may be determined for each digital output signal $S_{RXDIG,i}$, and respective phase differences $\Delta\varphi_i(f_{TEST}) = |\varphi_i(f_{TEST}) - \varphi_{ref}|$ may be calculated and compared with respective threshold values. The reference phase $\varphi_{ref}$ may be, for example, the phase $\varphi_1(f_{TEST})$ of the first channel CH1 or the phase $\varphi_{i-1}(f_{TEST})$ of the neighboring channel. Additional to the evaluation of the phases, the magnitudes $A_i(f_{TEST})$ may be evaluated for each channel $CH_i$ as explained for the previous example of FIGS. 3 and 4.

Figure 7:
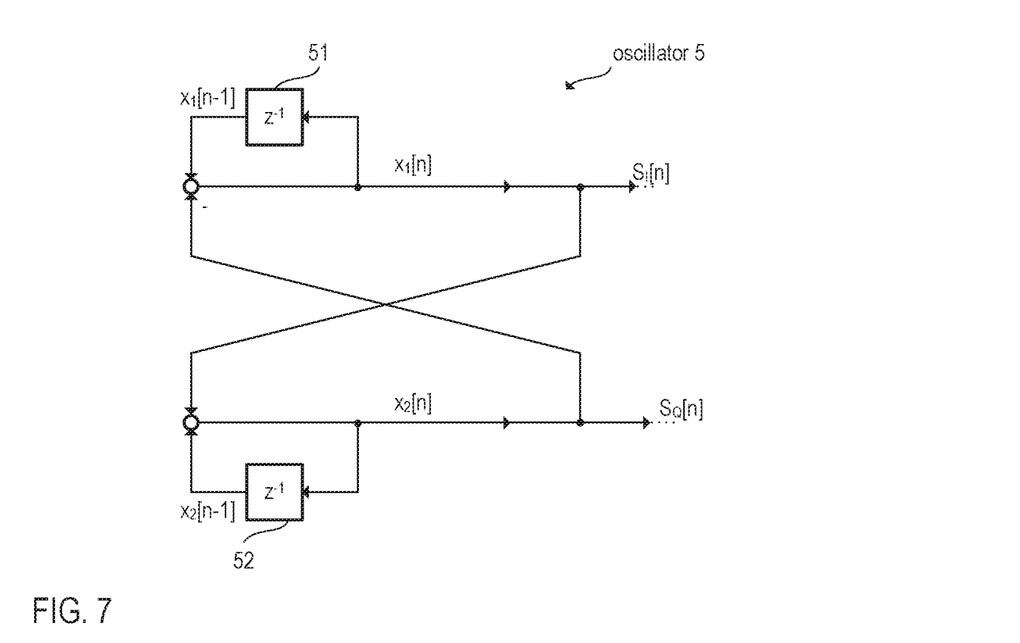
FIG. 7 illustrates an example of a second order harmonic digital oscillator.

In the following, the generation of the test signal $S_{TEST}$ and the RF test signal $S_{RFTEST}$ is explained in more detail. FIG. 7 illustrates one simple example of a second order harmonic digital oscillator 5, which may be used as test signal generator 18, e.g. in radar receivers as shown in FIGS. 3 and 5. The digital oscillator 5 includes two unit delay elements 51 and 52, whose output signals may be state signals $x_1[n-1]$ and $x_2[n-1]$, respectively (n being the time index). Accordingly, the input signals of the unit delay elements 51 and 52 are $x_1[n]$ and $x_2[n]$, respectively. The two delay elements are coupled such that the input signals $x_1[n+1]$ and $x_2[n+1]$ are determined according to the following equations:

$$x_1[n] = x_2[n], \text{ and} \quad (1)$$

$$x_2[n] = x_2[n-1] + x_1[n]. \quad (2)$$

The above equations 1 and 2 describe a second order discrete-time system and may be combined and z-transformed to obtain the following equation in $X_1(z)$ $$(z^2 - z + 1) \cdot X_1(z) = 0, \quad (3)$$

and the output signal $S_I[n]$ of the discrete-time system may be defined as $$S_I[n] = x_1[n]. \quad (4)$$

Figure 8:
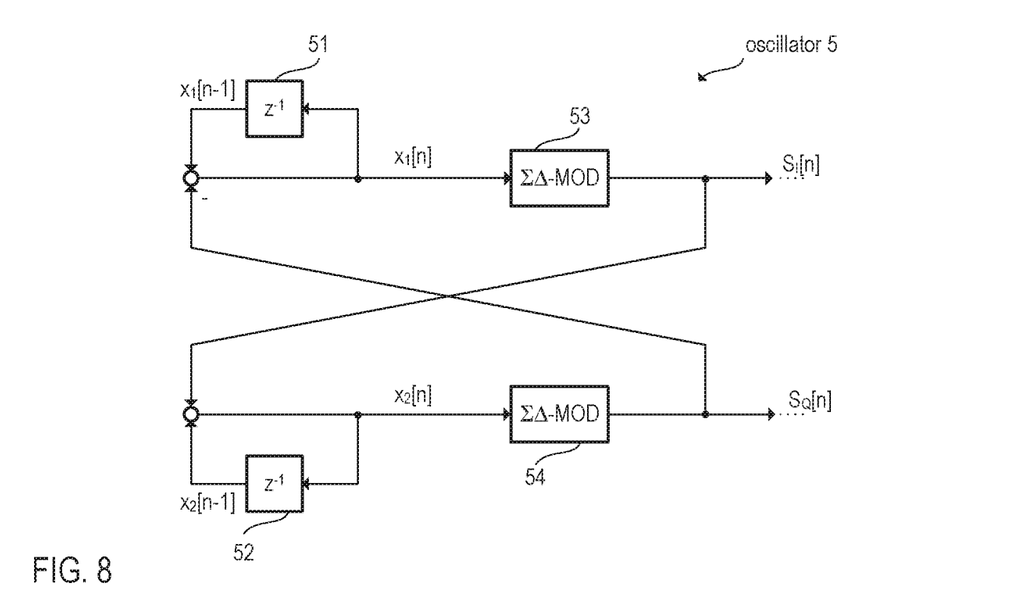
FIG. 8 illustrates an example of a second order harmonic digital oscillator with sigma-delta modulators.

Equation 3 may be used to calculate the oscillation frequency of the oscillator using known algorithms. It is noted that the digital state signals $x_1[n]$ can be regarded as b-bit signals, i.e. a sequence of digital words of b bits (b being a positive integer number). FIG. 8 illustrates a similar second order oscillator, which is essentially the same as the oscillator of FIG. 7 with additional sigma-delta modulators 53 and 54 coupled to the unit delay elements 51, 52 such that the sigma-delta modulators 53, 54 modulate the state signals $x_1[n]$ and $x_2[n]$. This sigma-delta modulation renders the implementation of the sums in equations 1 and 2 more simple (as compared to the previous example) as one summand (i.e. the sigma-delta modulator output signals) is always a 1-bit signal.

Figure 9:
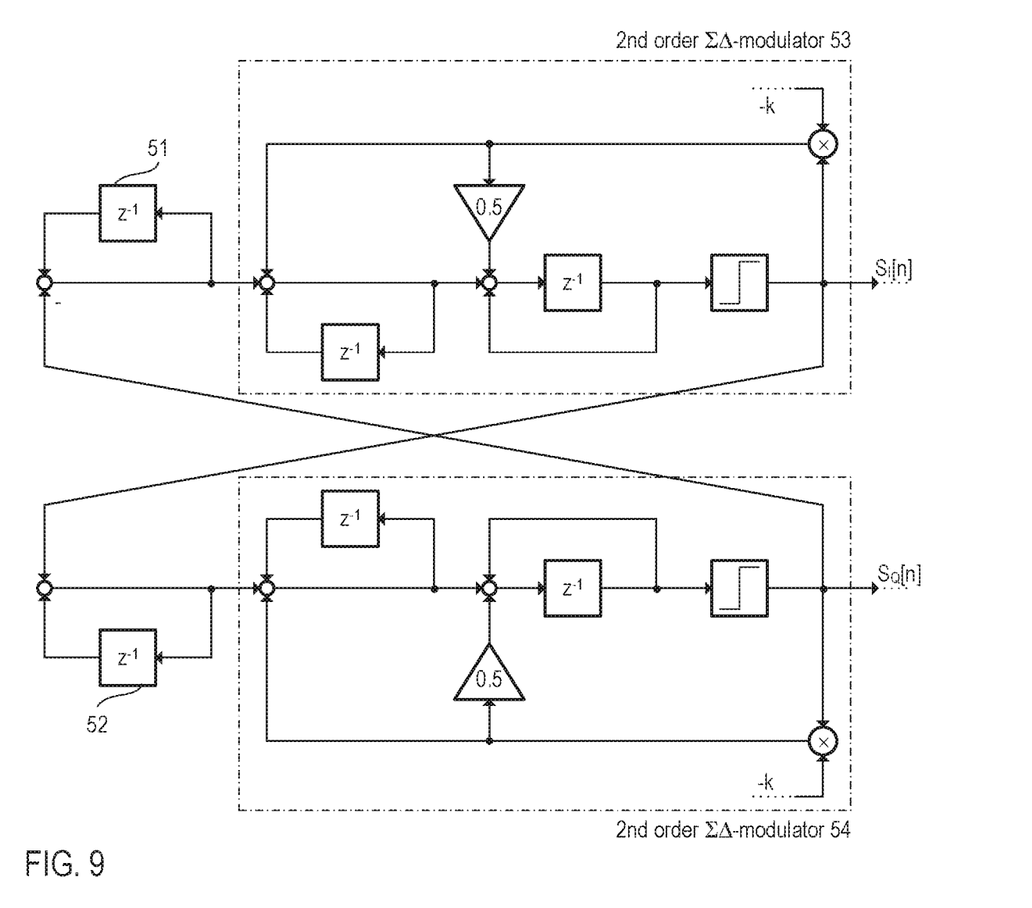
FIG. 9 illustrates one exemplary implementation of the oscillator structure of FIG. 8.
Figure 10:
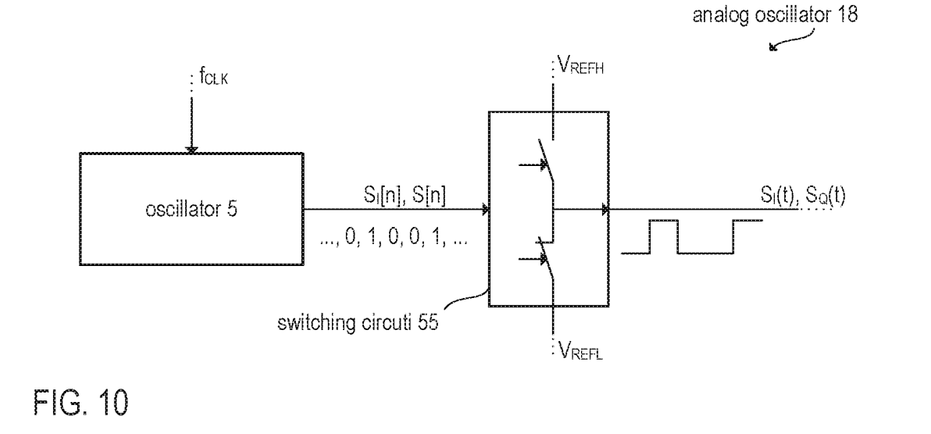
FIG. 10 illustrates the digital-to-analog conversion of the digital oscillator output of the oscillator of FIG. 9.

FIG. 9 illustrates one exemplary practical implementation of the oscillator of FIG. 8, wherein the sigma-delta modulators 53, 54 are implemented as second-order sigma-delta modulators. The implementation of the sigma delta modulators is as such known as second-order multi-stage noise shaping (MASH-2) structure and thus not further discussed herein. The parameter k, which is a positive number, may be tuned to set the frequency of the oscillator 5 to a desired value. The 1-bit digital output signal $S_I[n]$ of the oscillator may be converted to an analog signal using a very simple 1-bit digital-to-analog converter (DAC) as illustrated in FIG. 10. Basically, the 1-bit DAC includes a switching circuit 55 with two switches coupling the analog output node either to a high reference potential $V_{REFH}$ or to a low reference potential $V_{REFL}$. Accordingly, a sequence of 0-bits and 1-bits is converted to a waveform composed of consecutive high and low signal levels corresponding to the 1-bits and 0-bits, respectively.

The digital oscillator 5 (see FIG. 9) in combination with the switching circuit 55 (that may be regarded as a 1-bit DAC) may be regarded as an analog oscillator 18 as it generates an analog oscillator signal $S_I(t)$ (and $S_Q(t)$). It is noted that, due to the noise shaping characteristics of sigma-delta modulators included in the digital oscillator circuit 5 the quantization noise is "shifted" to higher frequencies, which can readily be suppressed by a low-pass or a band-pass filter. However, a separate filter is not necessarily required as the filtering may be accomplished, for example, by the base-band signal processing chain 13 (see, e.g., FIG. 2) included in the radar channel(s).

Figure 11:
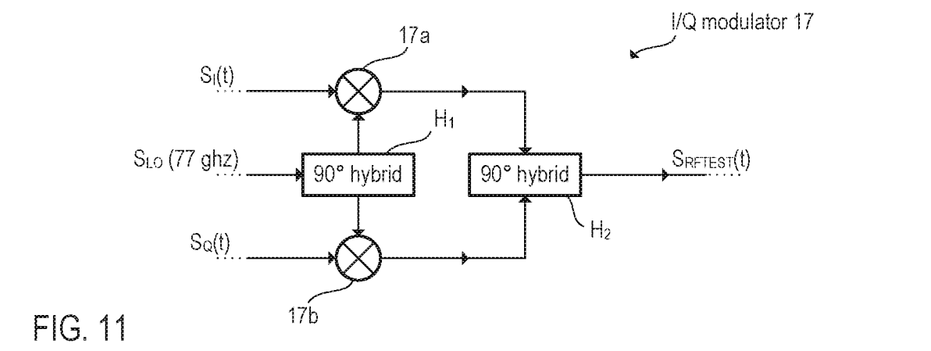
FIG. 11 illustrates one exemplary implementation of the modulation of the oscillator output signals to convert the test signal into the RF band.

Due to the symmetric configuration of the oscillator 5 (see FIGS. 7-9) two output signals may be tapped at the oscillator 5, i.e. an in-phase signal $S_I[n]$ as well as a respective quadrature signal $S_Q[n]$. The digital signals $S_I[n]$ and $S_Q[n]$ may be converted to corresponding analog signals $S_I(t)$ and $S_Q(t)$, respectively, e.g. using 1-bit DACs as showing in FIG. 10. Both signals may be used as test signal $S_{TEST}(t)$. Together, the in-phase and quadrature signals $S_I(t)$ and $S_Q(t)$, respectively, may be also regarded as one complex-valued test signal. As shown in the previous examples of FIGS. 3 and 5, the test signal $S_{TEST}(t)$ may be converted into the RF domain using a modulator (see, e.g., FIG. 3, mixer 17). When using an oscillator, which provides in-phase and quadrature signals $S_I(t)$ and $S_Q(t)$ instead of a single test signal $S_{TEST}(t)$, the modulator may be implemented as an I/Q modulator as shown in FIG. 11. Accordingly, the in-phase signal $S_I(t)$ is supplied to a first mixer 17a and the quadrature signal $S_Q(t)$ is supplied to a second mixer 17b. A first 90° hybrid coupler $H_1$ may be used to generate corresponding sine and cosine signals (orthogonal signals) based on the local oscillator signal $S_{LO}(t)$. The sine and cosine signals are then supplied to the mixers 17a and 17b, respectively, to convert in-phase and quadrature signals $S_I(t)$ and $S_Q(t)$ to the RF band. The resulting RF signals may be combined using a second 90° hybrid coupler $H_2$ as shown in FIG. 11. The resulting combined signal may be used as RF test signal $S_{RFTEST}(t)$.

Figure 12:
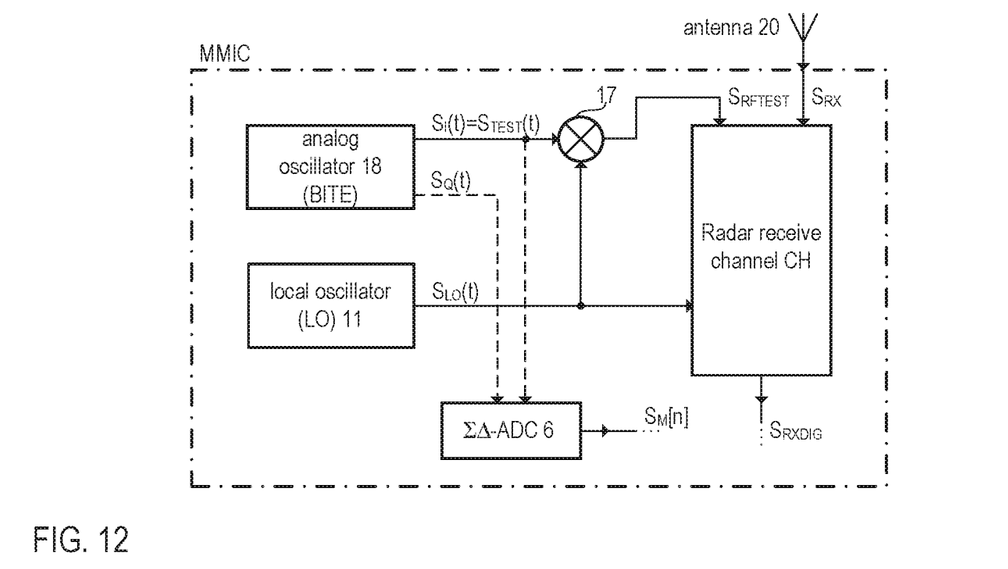
FIG. 12 illustrates schematically a block diagram of the MMIC including at least one radar reception channel as well as built-in test equipment such as the oscillator illustrated, e.g., in FIGS. 7 to 9.

FIG. 12 schematically illustrates an example of a block diagram of the MMIC including at least one radar reception channel as well as built-in test equipment (BITE) such as the oscillator 18 illustrated, e.g., in FIGS. 7 to 9 (which may be implemented using a digital oscillator 5 as shown in FIGS. 7-9 and a 1-bit DAC as shown in FIG. 10). It is understood that any components not needed for the present explanations are omitted in FIG. 12 for the sake of simplicity. In the present configuration, only the analog oscillator signal $S_I(t)$ is used as test signal $S_{TEST}(t)$, which is supplied to the modulator/mixer 17 that converts the test signal into the RF test signal $S_{RFTEST}(t)$ by modulating the test signal $S_{TEST}(t)$ with the the local oscillator signal $S_{LO}(t)$. Of course, an I/Q modulator may be used instead as shown in FIG. 11. The local oscillator (LO) 11 is also illustrated in FIG. 12. The radar reception channel CH may be implemented as illustrated in the examples shown in FIGS. 1 to 3. The MMIC may include multiple channels as illustrated in the example of FIG. 5.

In accordance with the example of FIG. 12, the MMIC also includes a sigma-delta analog-to-digital converter (ADC) 6, which may be configured to digitize various analog signals present in the MMIC for different purposes, such as power monitoring, etc. To test and validate the performance of the sigma-delta ADC 6, the analog oscillator signals $S_I(t)$ and $S_Q(t)$ may be supplied to the ADC 6 as input signals. The high-frequency noise components included in the analog oscillator signals $S_I(t)$ and $S_Q(t)$ are suppressed by the anti-aliasing filter (sigma-delta filter) included in the sigma-delta ADC 6. As mentioned above, due to the noise-shaping characteristics of sigma-delta modulators, the quantization noise included in the analog oscillator signals $S_I(t)$ and $S_Q(t)$ is shifted to high frequencies, which are then suppressed using one or more filters. As can be seen from the example of FIG. 12, the analog oscillator 18 may be used as a multi-purpose on-chip test equipment to test different components integrated in the chip including the radar reception channel as well as at least one additional ADC.

Figure 13:
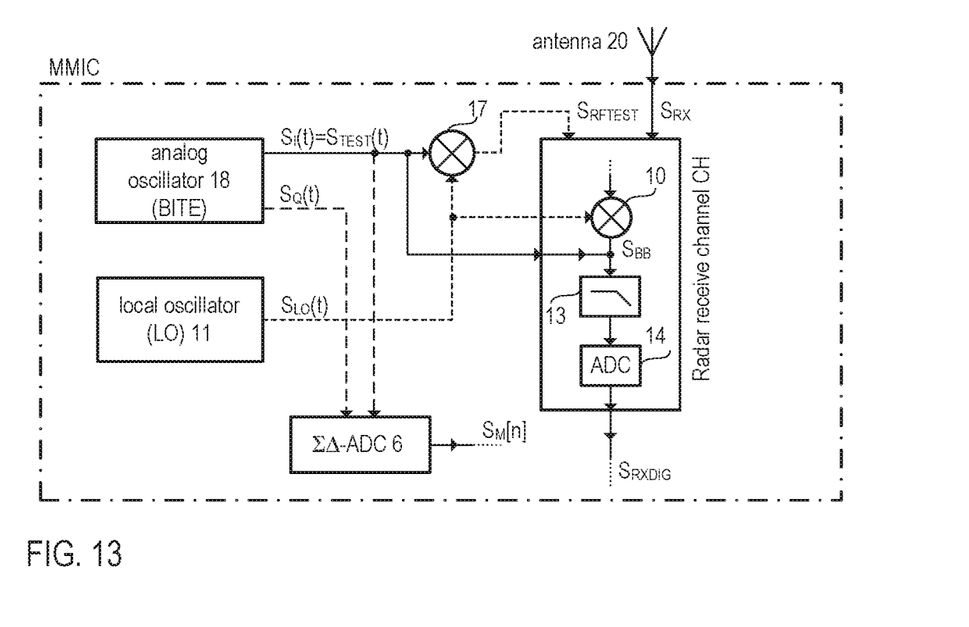
FIG. 13 illustrates an exemplary implementation of a MMIC similar to FIG. 12.

FIG. 13 illustrates an alternative implementation of the example shown in FIG. 12. The depicted example provides substantially the same BITE as the previous example with an additional capability of directly testing the analog (base-band) signal processing chain 13 included in a radar reception channel. For this purpose, the test signal $S_{TEST}$ provided by the oscillator 18, may be directly injected in the circuit node connecting the output of the mixer 10 and the analog signal processing chain 13, i.e. injected to the input of the analog signal processing chain 13. This allows separately testing the mixer 10 (using the RF test signal $S_{RFTEST}$, which is then down-converted by mixer 10) and the analog signal processing chain 13 using the test signal $S_{TEST}$, which is directly provided to the analog signal processing chain 13 thus bypassing the mixer 10.

It is understood that, in the examples of FIGS. 12 and 13, the oscillator 18 may be connected to the reception channel CH via one or more switches, multiplexers, couplers or the like, which are not explicitly shown in the depicted examples in order to keep the illustrations simple. Any known circuitry for signal distribution may be used to couple the test signal $S_{TEST}$ (provided by the oscillator 18) and/or the RF test signal $S_{RFTEST}$ (provided by the modulator 17) to one or more radar reception channels. Different radar channels may be tested simultaneously or sequentially, dependent on the application. As mentioned, the radar channels may be tested during idle times, in which no distance or velocity measurements are made.

Although the disclosure has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A radar device, comprising:
a test signal generator comprising:
a digital harmonic oscillator that is configured to generate a digital oscillator signal ($S_f[n]$) with a first spectral component, and
a digital-to-analog-converter that is configured to generate an analog oscillator signal ($S_f(t)$) based on the digital oscillator signal ($S_f[n]$);
a modulator configured to convert the analog oscillator signal ($S_f(t)$) into a radio frequency (RF) band for generating an RF test signal ($S_{RFTEST}$) that includes the first spectral component shifted to the RF band;
a radar channel (CH) including an RF receiver circuit that is configured to receive an RF input signal ($S_{RX}$), the RF receiver circuit including:
a mixer configured to receive the RF input signal ($S_{RX}$) and a local oscillator signal ($S_{LO}$) to down-convert the RF input signal ($S_{RX}$) into an intermediate frequency (IF) or base band, and to provide the down-converted RF input signal ($S_{RX}$) as mixer output signal ($S_{BB}$), and
an analog-to-digital converter configured to provide a digital radar signal ($S_{RXDIG}$) representing the mixer output signal ($S_{BB}$); and
a signal processor configured to receive the digital radar signal ($S_{RXDIG}$) and to determine at least one spectral component of the digital radar signal ($S_{RXDIG}$),
wherein, during a test, the RF test signal ($S_{RFTEST}$) is directed, as RF input signal, to the radar channel (CH), and
wherein the signal processor is configured to determine whether the at least one spectral component of the digital radar signal ($S_{RFTEST}$) corresponds to the first spectral component.

2. The radar device according to claim 1, wherein the digital harmonic oscillator includes at least one digital sigma-delta modulator that provides a 1-bit signal as digital oscillator signal ($S_f[n]$, $S_Q[n]$).

3. The radar device according to claim 2, wherein the digital-to-analog-converter is a 1-bit digital-to-analog-converter.

4. The radar device according to claim 3, wherein the digital-to-analog-converter includes a switching circuit that generates either a high analog signal level or a low analog signal level in accordance with the 1-bit signal.

5. The radar device according to claim 1, wherein the digital harmonic oscillator is a second-order oscillator.

6. The radar device according to claim 1, wherein the digital harmonic oscillator is configured to:
provide, as the digital oscillator signal ($S_f[n]$), an in-phase signal ($S_I[n]$), and
provide, as another digital oscillator signal, a quadrature signal ($S_Q[n]$); and
wherein the digital-to-analog-converter is configured to:
generate the analog oscillator signal ($S_f(t)$) based on the in-phase signal ($S_I[n]$), and
generate another analog oscillator signal ($S_Q(t)$) based on the quadrature signal ($S_Q[n]$).

7. The radar device according to claim 6, wherein the modulator is an I/Q modulator.

8. The radar device according to claim 1, wherein the analog-to-digital converter is configured to receive the analog oscillator signal ($S_f(t)$) at least during an analog-to-digital converter test.

9. The radar device according to claim 1, wherein the RF receiver circuit includes an analog signal processing chain coupled between the mixer and the analog-to-digital converter,
the analog signal processing chain including at least one analog filter.

10. The radar device according to claim 9, wherein the at least one analog filter is configured to suppress quantization noise included in the analog oscillator signal ($S_f(t)$).

11. The radar device according to claim 1, wherein during a further test, the analog oscillator signal ($S_f(t)$) is directed to a circuit node coupled to an output of the mixer of the radar channel (CH), and
wherein the signal processor is configured to perform a spectral analysis of the digital radar signal ($S_{RFTEST}$).

12. A radar device, comprising:
a test signal generator comprising:
a digital harmonic oscillator that is configured to generate a digital oscillator signal ($S_f[n]$) with a first spectral component, and
a digital-to-analog-converter that is configured to generate an analog oscillator signal ($S_f(t)$) based on the digital oscillator signal ($S_f[n]$);
a radar channel (CH) including a radio frequency (RF) receiver circuit that includes:
a mixer configured to receive an RF input signal ($S_{RX}$) of the radar channel (CH) and a local oscillator signal ($S_{LO}$) to down-convert the RF input signal ($S_{RX}$) into an intermediate frequency (IF) or base band, and to provide the down-converted RF input signal ($S_{RX}$) as mixer output signal ($S_{BB}$), and
an analog-to-digital converter configured to provide a digital radar signal ($S_{RXDIG}$) representing the mixer output signal ($S_{BB}$); and
a signal processor receiving the digital radar signal ($S_{RXDIG}$) and configured to perform a spectral analysis of the digital radar signal ($S_{RXDIG}$),
wherein, during a test, the analog oscillator signal ($S_f(t)$) is directed to a circuit node coupled to an output of the mixer of the radar channel (CH).

13. The radar device according to claim 12, wherein the digital harmonic oscillator includes at least one digital sigma-delta modulator that provides a 1-bit signal as digital oscillator signal ($S_f[n]$, $S_Q[n]$).

14. The radar device according to claim 13, wherein the digital-to-analog-converter is a 1-bit digital-to-analog-converter.

15. The radar device according to claim 14, wherein the digital-to-analog-converter includes a switching circuit that generates either a high analog signal level or a low analog signal level in accordance with the 1-bit signal.

16. A radar device, comprising:
a test signal generator comprising:
a digital harmonic oscillator that is configured to generate a digital oscillator signal ($S_f[n]$) with a first spectral component, and
a digital-to-analog-converter that is configured to generate an analog oscillator signal ($S_f(t)$) based on the digital oscillator signal ($S_f[n]$); and at least one radar channel (CH) configured to receive the analog oscillator signal ($S_f(t)$) during one or more self-tests.

17. A radar device, comprising:
a test signal generator comprising:
   a digital harmonic oscillator that is configured to generate a digital oscillator signal ($S_f[n]$) with a first spectral component, and
   a digital-to-analog-converter that is configured to generate an analog oscillator signal ($S_f(t)$) based on the digital oscillator signal ($S_f[n]$);
a modulator configured to convert the analog oscillator signal ($S_f(t)$) into a radio frequency (RF) band for generating an RF test signal ($S_{RFTEST}$) that includes the first spectral component shifted to the RF band; and
at least one radar channel (CH) configured to receive the RF test signal ($S_{RFTEST}$) during one or more self-tests.

18. The radar device according to claim 16, wherein the at least one radar channel includes an RF receiver circuit, the RF receiver circuit including:
   an analog signal processing chain configured to process the analog oscillator signal ($S_f(t)$); and
   an analog-to-digital converter configured to provide a digital radar signal ($S_{RXDIG}$).

19. The radar device according to claim 17, further comprising:
a local oscillator to generate a local oscillator signal ($S_{LO}(t)$); and
wherein the modulator, when converting the analog oscillator signal ($S_f(t)$) into the RF band, is configured to:
   modulate the analog oscillator signal ($S_f(t)$) with the local oscillator signal ($S_{LO}(t)$) to convert the analog oscillator signal ($S_f(t)$) into the RF band.

20. The radar device according to claim 17, wherein the at least one radar channel further comprises:
a mixer, and
an analog signal processing chain,
   wherein the RF test signal ($S_{RFTEST}$) enables testing the mixer; and
wherein the at least one radar channel is further configured to:
   receive the analog oscillator signal ($S_f(t)$) to enable testing the analog signal processing chain.

* * * * *